June 15, 1926.
H. R. WADE ET AL
1,589,024
PRINTING DIE
Filed July 6, 1925
FIG. I.
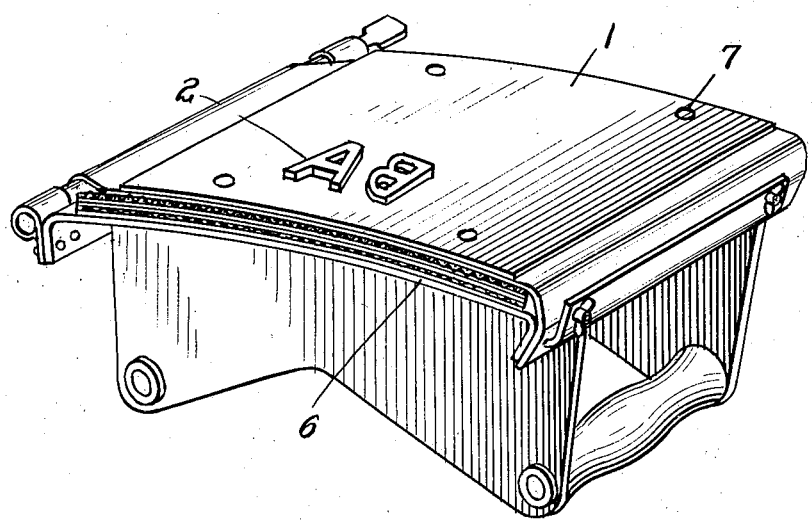
FIG. II.
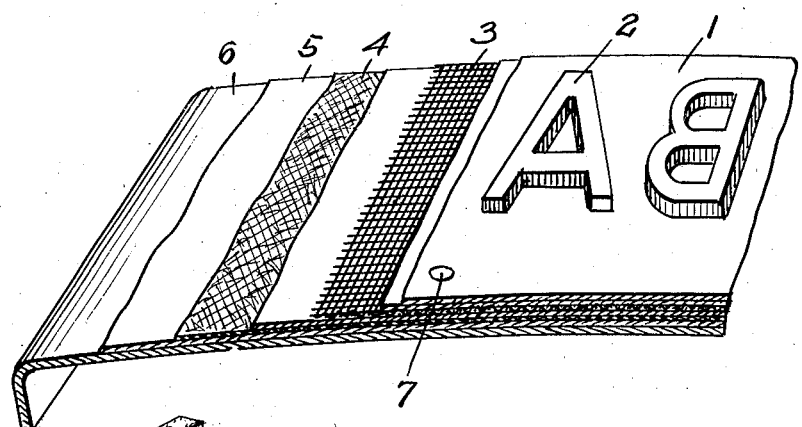
FIG. III.
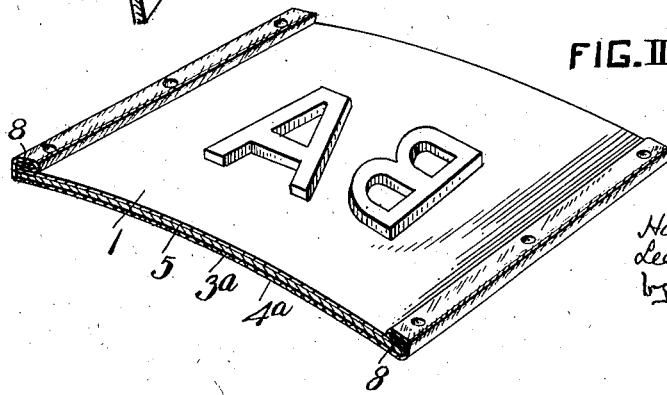
INVENTOR
Harold R Wade
Lee M. Harley
by Christy & Christy
Attys.

Patented June 15, 1926.

1,589,024

UNITED STATES PATENT OFFICE.

HAROLD R. WADE AND LEE M. HARLEY, OF PITTSBURGH, PENNSYLVANIA, ASSIGNORS TO JAS. H. MATTHEWS & COMPANY, OF PITTSBURGH, PENNSYLVANIA, A CORPORATION OF PENNSYLVANIA.

PRINTING DIE.

Application filed July 6, 1925. Serial No. 41,509.

Our invention relates to improvements in the construction of printing dies, and particularly to dies whose cylindrical printing surface is formed of rubber. Dies of this sort are largely used for printing brands on sheet metal, on packing boxes, on burlap, and for other such purposes.

Our invention is illustrated in the accompanying drawings, in which Fig. I shows in perspective a die of the sort with which our invention has to do; and Fig. II shows, fragmentarily, and to larger scale, the die body, and indicates, somewhat diagrammatically, both the compound structure of the die and the character of its printing face. Fig. III is a view similar to Fig. II, illustrating an alternative form of the invention in its broader aspect.

It is essential that the characters which the die carries be formed of soft rubber, and be raised in relief from the carrier body. This ordinarily is accomplished by molding. It is essential that the die be rigidly backed and supported for service. It is essential that the die body be uniform in thickness, that at all points the printing surface shall rise to uniform height from the surface of the support. It is desirable that the die keep its shape throughout prolonged service, and that it shall not become stretched and distorted, and particularly unequally stretched and distorted, in service. It has not hitherto been practicable to produce an article in which these essential and desirable qualities are in adequate and satisfactory degree combined. The conditions of manufacture are such as commercially to forbid the employment of expensive metal molds, and to require the provision of molds of plaster. It is impossible to withdraw from a plaster mold, without breaking the mold, a molded article of this sort, formed upon a rigid body. The molded article must be flexible.

Our invention meets these contradictory requirements. It consists in a die body having, built into it, as an integral part of it, an inlay of flexible metal, preferably of wire gauze. The finished article is flexible, and since it is flexible, when finished it may be withdrawn from the mold without injury to the mold. It may be molded flat, and may subsequently be shaped upon and secured to a rigid cylindrical carrier. Though flexible, the article as a whole is in the plane of its extent inelastic; it will not, therefore, stretch; nor will it, through prolonged use, become distorted in shape.

Referring to Fig. II of the drawings, the die body includes a layer of soft vulcanized rubber 1, with molded letters 2 raised in relief from its surface. Within the layer 1, built into the green rubber, and vulcanized in place, is an inlay 3 of wire gauze. The layer 1 is backed with a sheet of fabric 4, also built into the green rubber, and vulcanized in place. The body 1 so constituted is backed with a body 5 of sponge rubber.

According to principles of procedure in rubber die making, this compound article is built up in three parts: A layer of green rubber backed with wire gauze, which is to constitute the character-bearing part; a second layer of green rubber backed with fabric, which is to constitute the intermediate part; and a layer of green sponge rubber, which is to constitute the base of the finished article. These three separately formed components are then, while still in green condition, united, introduced into the mold, subjected to molding pressure, and then vulcanized in the mold.

The presence of the layer of sponge rubber enables us to produce a die body which is of uniform thickness throughout; for, while the solid rubber portions of the plane-surfaced blank, having but little capacity for lateral flow and lateral displacement of rubber incident to molding, is narrowly localized, the sponge rubber is relatively fluid. It affords by lateral displacement, full compensation for the pressing of characters in relief upon the surface, molding pressure is distributed evenly throughout the unvulcanized article, and after vulcanization the body of the article is of uniform thickness, and the characters rise to a common height from the base.

In Fig. I a carrier body or rocker 6 is shown, with the die body in application to it. The face of the carrier body will be understood to be rigid, formed ordinarily of steel, and cylindrical in shape. The die body, secured to it in suitable manner, is in this case shown to be secured by marginal clamping. But, by virtue of its inlay of wire gauze, the die body may be riveted to the carrier body, and so the more securely held. In Fig. II we have indicated at 7 a rivet hole for securing the die.

In Fig. III we show an article in which is included, not a layer of wire gauze, but a layer 3ª of thin and flexible sheet metal, in this instance of brass. In this case we include the layer of sponge rubber 5 in the blank, between the layer of solid rubber above and the layer of metal below. Preferably a layer of rubberized fabric 4ª is applied in green state, underlying the metal layer, and in the finished article this layer of fabric faces the metal beneath. The blank is pressed and the characters are raised upon the surface of the solid rubber layer and the article is vulcanized in the mold, all as in the case first described. The metal backing in this instance also is so far flexible as to allow withdrawal from the mold without injury to the mold, and to allow application of the finished article to its cylindrical carrier. The edge of the brass sheet, extending beyond the body of rubber may be bent over and constitute a binding for the edge of the body of rubber. The edge so formed may be reenforced with an infolded strip 8 of steel. This metal-backed article may be secured to its carrier in any preferred manner. Holes 7 for securing the die to place on its carrier may be formed through the so bound and reenforced edge. The fabric face 4ª for the metal may be continued over the edge.

We claim as our invention:

1. A printing die including in its structure a flexible layer of metal and a layer of rubber overlying the metal layer, bearing in relief printing characters, and vulcanized to union upon the metal layer, the edges of the metal layer being folded upon the edges of the rubber layer.

2. A printing die including in its structure a flexible layer of metal and a layer of rubber overlying the metal layer, bearing in relief printing characters, and vulcanized to union upon the metal layer, a reenforcing strip extending along the edge of the rubber layer, the edge of the metal layer being folded upon the reenforced edge of the rubber layer and the edge so built up being perforated for the passage of securing means.

3. A curved-surfaced printing die consisting of a rigid rocker and a flexible die body flexed upon and extending in continuity upon said rocker and removably secured in place thereon, said die body bearing in its continuous extent a succession of characters adapted to come successively to printing engagement with a surface upon which the assembled structure is rocked, the said die body including layers of rubber and of metal vulcanized together.

4. The method herein described of forming a flexible printing die of uniform thickness which consists in combining in green state an upper layer of solid rubber and a lower layer of sponge rubber, in association with a flexible layer of metal, pressing the combined blank and by pressure raising upon the upper surface of the upper layer, printing characters in relief, and, while pressure continues, effecting vulcanization.

In testimony whereof we have hereunto set our hands.

HAROLD R. WADE.
LEE M. HARLEY.